US012650195B2

(12) United States Patent

Benincosa et al.

(10) Patent No.: US 12,650,195 B2
(45) Date of Patent: Jun. 9, 2026

(54) METHOD AND SYSTEM FOR MAPPING AND INSPECTING LIVE FLUID PIPES

(71) Applicant: REDUCT NV, Schelle (BE)

(72) Inventors: William Benincosa, Chicago, IL (US); Dennis Jarnecke, River Forest, IL (US); Jeff Mainzer, Wheeling, IL (US); Francis X. Hennessey, III, Arlington Heights, IL (US); Jason Sphar, Mount Prospect, IL (US); Otto Ballintijn, Schilde (BE); Hans Van Nieuwenhuyze, Wilrijk (BE); Daan Tamsyn, Londerzeel (BE)

(73) Assignee: REDUCT NV, Schelle (BE)

( * ) Notice: Subject to any disclaimer, the term of this patent is extended or adjusted under 35 U.S.C. 154(b) by 238 days.

(21) Appl. No.: 18/039,827

(22) PCT Filed: Nov. 26, 2021

(86) PCT No.: PCT/EP2021/083237
§ 371 (c)(1),
(2) Date: Jun. 1, 2023

(87) PCT Pub. No.: WO2022/122424
PCT Pub. Date: Jun. 16, 2022

(65) Prior Publication Data
US 2024/0093826 A1 Mar. 21, 2024

Related U.S. Application Data

(60) Provisional application No. 63/122,141, filed on Dec. 7, 2020.

(51) Int. Cl.
*F16L 55/28* (2006.01)
*F16L 55/46* (2006.01)
(Continued)

(52) U.S. Cl.
CPC .............. *F16L 55/28* (2013.01); *F16L 55/46* (2013.01); *F16L 55/48* (2013.01); *F16L 2101/30* (2013.01)

(58) Field of Classification Search
CPC . F16L 55/28; F16L 55/46; F16L 55/48; F16L 2101/30; F17D 5/00; G01C 7/06
See application file for complete search history.

(56) References Cited

U.S. PATENT DOCUMENTS 8,547,428 B1 10/2013 Olsson et al.
2007/0051192 A1* 3/2007 Penza ..................... F16L 55/30
73/865.8
(Continued)

FOREIGN PATENT DOCUMENTS

EP 1494005 A1 1/2005
EP 3091334 A1 11/2016
(Continued)

OTHER PUBLICATIONS

International Search Report issued in PCT/EP2021/083237, mailed Mar. 22, 2022.

*Primary Examiner* — Laura Martin
*Assistant Examiner* — Anthony W Megna Fuentes
(74) *Attorney, Agent, or Firm* — Ipsilon USA—NLO

(57) ABSTRACT

Method and system for mapping and/or inspecting an underground pipeline infrastructure, using: a sensor probe for collecting geospatial data while travelling through a pipeline of the pipeline infrastructure, and a driving mechanism comprising a tether, for driving the sensor probe, wherein the sensor probe is provided to enter the pipeline at a vertical angle through a live-fluid entry apparatus and once inside the pipeline make a 90° angle change of direction to align with the orientation of the pipeline.

14 Claims, 1 Drawing Sheet

(51) Int. Cl.
    F16L 55/48            (2006.01)
    F16L 101/30          (2006.01)
    G01C 7/06            (2006.01)
    *F17D 5/00*             (2006.01)

(56)              References Cited

U.S. PATENT DOCUMENTS

2020/0173602 A1    6/2020   Olsson et al.
2020/0256501 A1    8/2020   Louise-Alexandrine Baron et al.

FOREIGN PATENT DOCUMENTS

EP         3203185 A1    8/2017
WO    2014/148760 A1    9/2014

\* cited by examiner

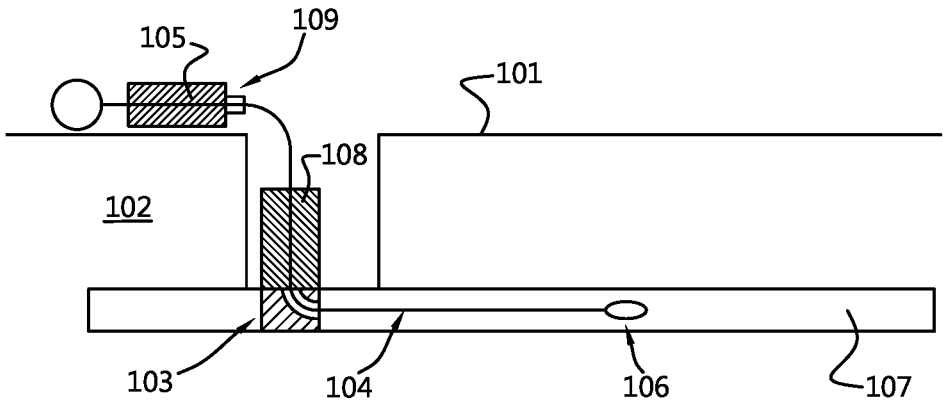

METHOD AND SYSTEM FOR MAPPING AND INSPECTING LIVE FLUID PIPES

CROSS-REFERENCE TO RELATED APPLICATIONS

This application is a U.S. National Phase Application filed under 35 U.S.C. § 371, based on International Patent Application No. PCT/EP2021/083237, filed Nov. 26, 2021, which claims priority to U.S. Provisional Patent Application No. 63/144,121, filed on Dec. 7, 2020, the contents of which are incorporated herein by reference in their entirety.

This invention was made with Government support under agreement No. 693JK31810009 awarded by the U.S. Department of Transportation, PHMSA. The Government may have certain rights to this invention.

TECHNICAL FIELD

This invention relates generally to in-line tools for pipeline inspection and/or pipeline mapping, and more particularly to a method and system for mapping and inspecting live fluid pipes.

BACKGROUND ART

The underground natural gas utility infrastructure is vast and expansive. These systems can span thousands of miles underneath the ground and are very challenging to inspect and map. Often, records are kept with low accuracy positioning data or stored via paper facilitating a need to collect highly accurate and digital location data. Some solutions can map pipelines from the surface, but lack verification that the mapped conduit is that actual asset. Soil conditions, pipe wall material, or adjacent underground facilities can negatively impact this location data. There are efforts to create in-line robots or pigs that combine pipeline inspection and mapping, but these devices typically work in pipes greater than 6 inches in diameter. These devices also typically require expensive launching and retrieving equipment.

Current technologies are generally applied to only "out-of-service" pipelines and not to "live" pipelines, the latter meaning that the inspection and/or mapping occurs while the pipelines are in use for supplying a fluid, such as natural gas.

There is a continuing need for improved systems for mapping and inspecting underground pipeline infrastructures.

DISCLOSURE OF THE INVENTION

It is an aim of the present invention to provide an improved system and method for mapping and inspecting underground pipeline infrastructures, in particular live fluid pipes.

The invention generally relates to a method and system to insert and propel a sensor payload in pipelines. The invention is applicable to any size pipeline, and is particularly useful for small diameter (less than 6 inches) live-fluid pipeline mapping. The sensor payload can provide highly accurate trajectories of pipeline assets without interrupting service to downstream customers.

Embodiments of this invention include a probe, which incorporates structure and functionality for live fluid entry, propulsion, and externally mounted odometer data collection. The sensor probe may be provided to enter small diameter (down to but not limited to 2-inch diameter) pipe at a vertical angle, and once inside the pipe make a 90° angle change of direction into the live-fluid pipe. The 90° entry angle facilitates bi-directional travel in small diameter pipe which is improved upon existing 45° entry angles. The sensor payload may be provided to tag internal pipeline features and anomalies with 3D geospatial position. This tool may be provided to verify underground asset location, identify internal gas pipe anomalies, and improve underground threat detection. Compared to walk-over tracing techniques, this method is more time efficient, and the data output has a higher resolution of location points. This in turn significantly reduces risk from excavation damage and costs during construction activities.

Embodiments of this invention include a system and method to collect high resolution and high accuracy 3D geospatial data in live fluid pipes. Embodiments of this invention include an inertial navigation sensor payload that is provided to collect x, y, and z geospatial data, and may be provided to enter down to but not limited to 2 inch diameter live fluid pipes by means of a vertical entry method. The sensor payload may be provided to collect high frequency data in one direction and then extract the sensor payload from the fluid pipe for data upload. The system and sensor payload may be provided to collect data in both directions and then be extracted from the fluid pipe for data upload.

Embodiments of this invention include inertial navigation-based mapping technology, containing a sensor payload of, without limitation, micro-electro-mechanical (MEMS) sensors, optionally complemented with some form of odometer functionality, to autonomously record the path travelled as pipeline profile, from a known start-point coordinate and known end-point or guide-point coordinate. A real-time or post-processing software can merge the known coordinates with the profile to obtain a highly accurate position of the pipeline.

Embodiments of this invention include an odometer that is mounted externally or internally in the sensor payload, which is used to measure length in the trajectory calculation.

Embodiments of this invention include a system that provides a guide shoe to be vertically inserted into an opening in a fluid pipe through an opening that is smaller than the pipe diameter, but greater than the sensor payload. The system desirably provides access down to, but not limited to, a 2 inch pipe and is provided to guide a sensor payload in the preferred direction of travel.

Embodiments of this invention include an autonomous-operation sensor payload that is sufficiently small and compartmentalized to pass through the guide shoe and, once inside, the fluid pipe of at least 2 inches in diameter and is provided to make a 90-degree turn to align with the orientation of the fluid pipe. The compartmentalization of the sensor probe may enable or facilitate the sensor probe to make the 90° turn.

Embodiments of this invention include a sensor payload that does not interfere with fluid within the pipe. The sensor payload is sufficiently small so that fluid can pass by, thus enabling travel with or against the flow of the fluid.

In embodiments of this invention the sensor payload is shielded or otherwise configured to not be susceptible to electromagnetic interference. In this manner, the sensor payload can be deployed in all pipe materials, including PE, steel and PVC, as well as near live power cables and other sources of electromagnetic interference that typically have a negative impact on the accuracy of other mapping methods.

Embodiments of this invention include a sonde or a camera in or with the sensor payload.

Embodiments of this invention incorporate an integrated copper tracer wire into the tether.

Embodiments of this invention incorporate power and/or two-way data transmission into and through the tether.

Embodiments of this invention produce a high frequency of three-dimensional coordinates.

The invention provides a system and method to collect internal fluid pipe data with x, y, and z location.

Embodiments of this invention include a camera with the sensor payload. The x, y, and z location data can be tagged to features detected by the camera. Fluid pipe features can be identified with a sensor analyzer system accompanied by the x, y, and z geospatial data.

Embodiments of this invention include a system of propulsion that can be by hand, or by machine assistance.

In embodiments of the invention, the sensor payload may be provided to be propelled by a fiber rod or equivalent, with or without an integrated tracer wire, and/or two-way data communication, and/or power feed.

In embodiments of the invention, three-dimensional (x, y, z) data is extracted from the raw data by means of a post-processing software algorithm.

In embodiments of the invention, additional data collected by the sensor payload can be post-processed so that internal data can be fused with x, y, and z location coordinates.

Embodiments of this invention are used in combination with above ground locating device, such as through an electromagnetic field generator on or with the sensor payload.

Other objects and advantages will be apparent to those skilled in the art from the following detailed description taken in conjunction with the appended claims and drawings.

BRIEF DESCRIPTION OF THE DRAWINGS

The invention will be further elucidated by means of the following description and the appended FIGURES.

FIG. 1 shows a system according to one embodiment of this invention.

MODES FOR CARRYING OUT THE INVENTION

The present invention will be described with respect to particular embodiments and with reference to certain drawings but the invention is not limited thereto but only by the claims. The drawings described are only schematic and are non-limiting. In the drawings, the size of some of the elements may be exaggerated and not drawn on scale for illustrative purposes. The dimensions and the relative dimensions do not necessarily correspond to actual reductions to practice of the invention.

Furthermore, the terms first, second, third and the like in the description and in the claims, are used for distinguishing between similar elements and not necessarily for describing a sequential or chronological order. The terms are interchangeable under appropriate circumstances and the embodiments of the invention can operate in other sequences than described or illustrated herein.

Moreover, the terms top, bottom, over, under and the like in the description and the claims are used for descriptive purposes and not necessarily for describing relative positions. The terms so used are interchangeable under appropriate circumstances and the embodiments of the invention described herein can operate in other orientations than described or illustrated herein.

Furthermore, the various embodiments, although referred to as "preferred" are to be construed as exemplary manners in which the invention may be implemented rather than as limiting the scope of the invention.

The term "comprising", used in the claims, should not be interpreted as being restricted to the elements or steps listed thereafter; it does not exclude other elements or steps. It needs to be interpreted as specifying the presence of the stated features, integers, steps or components as referred to, but does not preclude the presence or addition of one or more other features, integers, steps or components, or groups thereof. Thus, the scope of the expression "a device comprising A and B" should not be limited to devices consisting only of components A and B, rather with respect to the present invention, the only enumerated components of the device are A and B, and further the claim should be interpreted as including equivalents of those components.

FIG. 1 shows a system according to one embodiment of this invention, and a method of use for entering a live fluid pipe with a sensor payload 106 to map and/or inspect the pipe. A section of live fluid pipe 107 is excavated by making a hole in the ground 102 above, to reveal an insertion point. Live fluid pipe 107 can be any means of housing or conveying utilities. The sensor payload 106 can enter at an upright 90-degree angle via live entry apparatus 108 to enable two-way travel. Live-fluid entry apparatus 108 can be, for example, a Jameson™ directional entry tool. Sensor payload 106 is attached to tether 104. The sensor payload 106 can be or include any suitable sensor, such as a Reduct™ MEMS based tool. Tether 104 can be a flexible fiberglass rod with or without an integrated tracer wire for surface location, or can be a Condux™ push rod, optionally supplemented by an electric, hand-driven, or pneumatic pushing solution. Tether 104 can also supply power and two-way data communication to the sensor payload 106. Tether 104 is pushed through external odometer 109, which may be provided above the surface 101 as shown. The external odometer 109 records the pipe length (distance travelled by the sensor payload 106). This is fused with sensor payload 106 data and a start coordinate, and a second coordinate, to provide x, y, and z position data with accompanying sensor analysis along the trajectory of the live fluid pipe. Optionally this could be fused with sensor travel duration data. Propulsion is enabled by conveying tether 104 via external driving force 105, which can be provided by manual force by an operator or a system of motors. Sensor payload 106 is guided by launch shoe 103 in the direction of choice. While driving the sensor payload, x, y, and z positional data can be collected from the MEMS-sensors while features are recorded by the sensor analyzer system. Feature data and x, y, and z data can be post-processed or viewed in real-time to locate features and abnormalities so that underground pipeline owners can obtain accurate maps of their systems with internal inspection data through one internal mapping and inspection system.

The invention illustratively disclosed herein suitably may be practiced in the absence of any element, part, step, component, or ingredient which is not specifically disclosed herein.

Embodiments of the invention may be formalized by the following clauses.

Clause 1. A system for collecting geospatial data in a pipeline, the system including:

a guide shoe configured to be vertically inserted into an opening in the pipeline;

a sensor configured to be inserted into the pipeline through the guide shoe, wherein the sensor is configured to access pipelines at least two inches in diameter, without interfering with a fluid in the pipeline; and a tether connecting the sensor to a driving mechanism.

Clause 2. The system of clause 1, further comprising an odometer in combination with the tether.

Clause 3. A method of collecting geospatial data in a pipeline, the method comprising:

vertically connecting a guide shoe to an underground pipeline;

inserting a sensor with a tether into the pipeline through the guide shoe; and collecting x, y, and z geospatial data within the pipeline as the sensor travels through the pipeline.

Clause 4. The method of clause 3, further comprising:

coordinating pipeline features with x-, y-, and z-axis location data obtained by the sensor.

Clause 5. The method of clause 3, further comprising:

determining a distance traveled by the sensor by measuring the tether.

Clause 6. The method of clause 3, wherein the sensor is configured to access pipelines at least two inches in diameter, without interfering with a fluid in the pipeline.

The invention claimed is:

1. System for live mapping a pipeline of an underground pipeline infrastructure, wherein the pipeline has a diameter of 2 to 6 inches, comprising:

a sensor probe containing an autonomous-operation sensor payload configured to collect geospatial data while travelling through the pipeline of the pipeline infrastructure and while the pipeline is in use for supplying a fluid, wherein the sensor payload is shielded to not be susceptible to electromagnetic interference, wherein a pipeline profile is obtainable from the collected geospatial data, a live-fluid entry apparatus, a guide shoe configured to be inserted into the pipeline through the live-fluid entry apparatus and configured to guide the sensor probe through a 90° angle change of direction upon entry into the pipeline, and a driving mechanism including a tether, configured to drive the sensor probe, wherein the sensor probe is sized and compartmentalized for passing through the guide shoe, and wherein the sensor probe is provided to enter the pipeline at a vertical angle through the live-fluid entry apparatus and once inside the pipeline, passing through the guide shoe to make the 90° angle change of direction to align with the orientation of the pipeline.

2. The system according to claim 1, wherein the sensor probe has an aerodynamic shape configured to reduce interference with a fluid in the pipeline.

3. The system according to claim 1, further comprising an odometer configured to record a distance travelled by the sensor probe as it is driven through the pipeline.

4. The system according to claim 3, wherein the odometer is external to the sensor probe and is provided to record the length of the tether that passes along the odometer.

5. The system according to claim 1, wherein the sensor probe comprises an inertial navigation sensor payload that is configured to collect x, y, and z geospatial data in at least one of a forwards travelling direction and a backwards travelling direction.

6. The system according to claim 1, wherein the sensor probe is configured for use in combination with an above ground locating device through an electromagnetic field generator on or with the sensor probe, for determining at least one location coordinate including a start-point coordinate, an end-point coordinate and/or a guide-point coordinate.

7. The system according to claim 1, wherein the tether is a fiber rod.

8. A non-transitory storage medium storing a post-processing software which is configured to, when executed on a computer system, merge geospatial data collected by means of the sensor probe defined in claim 1, a path travelled by the sensor probe recorded by means of an odometer, and at least one location coordinate determined by means of the sensor probe in combination with an above ground locating device.

9. A method for live mapping a pipeline of an underground pipeline infrastructure, wherein the pipeline has a diameter of 2 to 6 inches, comprising:

providing a live-fluid entry apparatus, entering a sensor probe containing an autonomous-operation sensor payload into the pipeline of the pipeline infrastructure, wherein the sensor payload is provided for collecting geospatial data while travelling through the pipeline of the pipeline infrastructure, wherein the sensor payload is shielded to not be susceptible to electromagnetic interference, driving the sensor probe by means of a driving mechanism including a tether, and collecting geospatial data by means of the sensor probe while it travels through the pipeline and while the pipeline is in use for supplying a fluid, wherein a pipeline profile is obtainable from the collected geospatial data, wherein the sensor probe is entered into the pipeline at a vertical angle through the live-fluid entry apparatus and makes a 90° angle change of direction once inside the pipeline to align with the orientation of the pipeline, wherein the sensor probe is entered into the pipeline by means of a guide shoe which is inserted into the pipeline through the live-fluid entry apparatus and guides the sensor probe upon entry into the pipeline, and wherein the sensor probe is sized and compartmentalized for passing through the guide shoe to make the 90° angle change of direction to align with the orientation of the pipeline.

10. The method according to claim 9, further comprising recording a distance travelled by the sensor probe as it is driven through the pipeline, by means of an odometer.

11. The method according to claim 10, wherein the odometer is external to the sensor probe and records the length of the tether that passes along the odometer.

12. The method according to claim 9, wherein the sensor probe is used in combination with an above ground locating device through an electromagnetic field generator on or with the sensor probe, for determining at least one location coordinate including a start-point coordinate, an end-point coordinate and/or a guide-point coordinate.

13. The method according to claim 9, wherein a post-processing software is used to merge the geospatial data collected by means of the sensor probe, a path travelled by the sensor probe recorded by means of an odometer, and at least one location coordinate determined by means of the sensor probe in combination with an above ground locating device.

14. The method according to claim 9, wherein the sensor probe collects the geospatial data in at least one of a forwards travelling direction and a backwards travelling direction.

* * * * *